UNITED STATES PATENT OFFICE.

PHILIP L. J. SCHAEFER, OF KANSAS CITY, MISSOURI, ASSIGNOR TO HIMSELF AND HUGO ERNST MAX WIESE, OF SAME PLACE.

SALVE.

SPECIFICATION forming part of Letters Patent No. 370,823, dated October 4, 1887.

Application filed November 27, 1886. Serial No. 220,061. (No specimens.)

*To all whom it may concern:*

Be it known that I, PHILIP L. J. SCHAEFER, of Kansas City, in the county of Jackson and State of Missouri, have invented a new and useful Composition of Matter Used as a Salve, of which the following is a specification.

My invention relates to a composition of matter, and has for its object to produce a salve having great healing properties especially adapted for use in cases of erysipelas, chronic sores, piles, bites of all kinds, and also in inflammation of the eyes, throat, liver, or stomach.

My composition consists of the following ingredients, combined in substantially the proportions stated: olive-oil, eighteen parts; calendula officinalis, twelve parts; best sperm-oil, eighteen parts; silver litharge, twelve parts; red lead, twelve parts; gum of turpentine, eighteen parts, and refined lard, ten parts. Total, one hundred parts.

In the preparation of my compound the silver litharge and red lead, together with a portion of the oil, should be thoroughly mixed with a palette-knife or similar instrument. The calendula officinalis is then mixed with the remaining portion of the oil and boiled for about ten minutes. After straining the boiled oil and calendula, the other ingredients are added thereto one after the other and the entire mass allowed to boil until a good foam is produced. The mixture is now thoroughly strained and allowed to cool.

The chemical process which the compound undergoes in preparation binds the various ingredients together, evaporating their injurious properties, yet preserving intact all that is beneficial.

In use the salve will never heal a sore until all poisonous matter has been fully discharged. Then the healing is commenced from the deepest point.

When the mixture is spread upon paper or similar material and applied in the form of a plaster, it becomes a great pain-killer, and is found very efficacious in all forms of inflammation, burns, and sundry other complaints of a similar nature.

What I claim, and desire to secure by Letters Patent, is—

The herein-described composition of matter to be used as a salve, consisting of olive-oil, calendula officinalis, sperm-oil, silver litharge, red lead, gum of turpentine, and lard, substantially in the proportions specified.

PHILIP L. J. SCHAEFER.

Witnesses:
CHARLES DIEREN,
F. C. MEYER.